(12) United States Patent
Varanda (10) Patent No.: US 11,989,294 B2
(45) Date of Patent: May 21, 2024

(54) DETECTING AND PREVENTING INSTALLATION AND EXECUTION OF MALICIOUS BROWSER EXTENSIONS

(71) Applicant: Bank of America Corporation, Charlotte, NC (US)

(72) Inventor: Ricardo Varanda, Reading (GB)

(73) Assignee: Bank of America Corporation, Charlotte, NC (US)

( * ) Notice: Subject to any disclaimer, the term of this patent is extended or adjusted under 35 U.S.C. 154(b) by 705 days.

(21) Appl. No.: 17/143,636

(22) Filed: Jan. 7, 2021

(65) Prior Publication Data
US 2022/0215095 A1    Jul. 7, 2022

(51) Int. Cl.
*G06F 21/56* (2013.01)
*G06F 9/445* (2018.01)
*G06F 21/54* (2013.01)
*G06F 21/57* (2013.01)

(52) U.S. Cl.
CPC ........ *G06F 21/566* (2013.01); *G06F 9/44526* (2013.01); *G06F 21/54* (2013.01); *G06F 21/577* (2013.01); *G06F 2221/033* (2013.01)

(58) Field of Classification Search
CPC ............. H04L 63/1416; H04L 63/1441; G06F 21/566; G06F 21/54; G06F 21/577; G06F 9/44526; G06F 2221/033
See application file for complete search history.

(56) References Cited

U.S. PATENT DOCUMENTS

| | | |
|---|---|---|
| 2008/0163088 A1 | 7/2008 | Pradhan et al. |
| 2010/0235637 A1 | 9/2010 | Lu et al. |
| 2012/0246701 A1 | 9/2012 | Swamy et al. |
| 2013/0198842 A1 | 8/2013 | Klein et al. |
| 2013/0239214 A1 | 9/2013 | Klein et al. |
| 2013/0247030 A1 | 9/2013 | Kay et al. |
| 2014/0020053 A1 | 1/2014 | Kay et al. |
| 2014/0053267 A1 | 2/2014 | Klein et al. |
| 2015/0007330 A1 | 1/2015 | Gomez |
| 2015/0281318 A1 | 10/2015 | Warner et al. |
| 2015/0341367 A1 | 11/2015 | Kus et al. |
| 2015/0341385 A1 | 11/2015 | Sivan et al. |
| 2016/0103929 A1 | 4/2016 | Wespel et al. |
| 2016/0314301 A1 | 10/2016 | Johns et al. |

(Continued)

*Primary Examiner* — Paul E Callahan
(74) *Attorney, Agent, or Firm* — Banner & Witcoff, Ltd.

(57) ABSTRACT

Aspects of the disclosure relate to detecting and preventing malicious browser extensions. A computing platform may send rule information to a master browser extension on a computing device including a set of rules defining reportable behavior associated with one or more other browser extensions. Subsequently, the computing platform may receive report information from the master browser extension on the computing device identifying an other browser extension of the one or more other browser extensions that exhibit the reportable behavior defined by at least one rule of the set of rules in the rule information. Based on receiving the report information, the computing platform may determine that the identified other browser extension is a malicious extension. Then, the computing platform may send one or more commands to the master browser extension on the computing device directing the master browser extension to disable or remove the identified other browser extension.

18 Claims, 8 Drawing Sheets

(56) References Cited

U.S. PATENT DOCUMENTS

| | | |
|---|---|---|
| 2016/0330172 A1 | 11/2016 | Muttik |
| 2017/0006046 A1* | 1/2017 | Kuskov et al. |
| 2017/0353476 A1* | 12/2017 | Gordon ................ G06F 21/566 |
| 2018/0343174 A1 | 11/2018 | Battre et al. |
| 2019/0215304 A1 | 7/2019 | Yang et al. |
| 2019/0281059 A1* | 9/2019 | Chittampally ........ G06F 16/953 |
| 2020/0084225 A1 | 3/2020 | McKendall et al. |
| 2020/0104483 A1 | 4/2020 | Brezo Fernández et al. |
| 2020/0137110 A1 | 4/2020 | Tyler et al. |
| 2020/0151325 A1 | 5/2020 | Chen et al. |
| 2020/0218433 A1 | 7/2020 | Batchelder et al. |
| 2020/0218434 A1 | 7/2020 | Batchelder et al. |

\* cited by examiner

DETECTING AND PREVENTING INSTALLATION AND EXECUTION OF MALICIOUS BROWSER EXTENSIONS

BACKGROUND

Aspects of the disclosure relate to computer system security to detecting and preventing installation and execution of malicious browser extensions. In particular, one or more aspects of the disclosure relate to detecting and preventing malicious browser extensions using a master browser extension.

Browser extensions are openly available on "app stores" (e.g., application stores or marketplaces) that make available different applications for various platforms. While many browser extensions are useful and provide a customized browser experience, some browser extensions may be intentionally designed to be harmful and compromise computer security. In many instances, browser extensions introduce an additional channel for bad actors to deploy malicious code. For example, because extensions might not be extensively screened before they are published (e.g., in app stores), it might not be difficult to publish malicious browser extensions. In some instances, extensions may be granted permissions (e.g., to "read and change all the data on the websites you visit") by default (e.g., without user confirmation). Also, in some instances, code for extensions may run as part of a browser (e.g., an already trusted application), and it thus may be difficult to detect and prevent extensions that are or may be potentially harmful. As such, a compromised endpoint computing device may expose a user's private and/or sensitive information (e.g., login credentials, security keys, and the like) to a third party during networked communications, such as when communicating with a server device via a web browser.

SUMMARY

Aspects of the disclosure provide effective, efficient, scalable, and convenient technical solutions that address and overcome the technical problems associated with detecting and preventing malicious browser extensions. For example, some aspects of the disclosure may leverage a master web browser extension (e.g., managed by an enterprise or organization) to monitor other browser extensions (e.g., third party extensions) for potential malware and/or to perform other functions.

In accordance with one or more embodiments, a computing platform having at least one processor, a communication interface, and memory may send, via the communication interface, to a master browser extension on a computing device, rule information including a set of rules defining reportable behavior associated with one or more other browser extensions. Subsequently, the computing platform may receive, via the communication interface, from the master browser extension on the computing device, report information identifying an other browser extension of the one or more other browser extensions that exhibit the reportable behavior defined by at least one rule of the set of rules in the rule information. Based on receiving the report information, the computing platform may determine that the identified other browser extension is a malicious extension. Next, the computing platform may send, via the communication interface, to the master browser extension on the computing device, one or more commands directing the master browser extension on the computing device to disable or remove the identified other browser extension.

In some embodiments, the computing platform may cause a notification indicating the disabling or removal of the identified other browser extension to be displayed on a display device of the computing device.

In some embodiments, receiving the report information may include receiving information indicating which rules of the set of rules have been met.

In some embodiments, determining that the identified other browser extension is a malicious extension may include evaluating a combination of rules of the set of rules indicated as being met.

In some embodiments, the computing platform may cause the master browser extension on the computing device to scan the one or more other browser extensions on the computing device upon startup of a browser, on a periodic basis, based on a new extension being installed, or based on a browser accessing a specific website.

In some embodiments, the computing platform may cause the master browser extension on the computing device to discover one or more other browser extensions on the computing device that exhibit the reportable behavior defined by at least one rule of the set of rules in the rule information.

In some embodiments, the computing platform may cause the master browser extension to be installed on the computing device in accordance with enterprise policy.

In some embodiments, receiving the report information from the master browser extension on the computing device may include receiving information indicating that the other browser extension of the one or more other browser extensions is requesting high risk permissions.

In some embodiments, receiving the report information from the master browser extension on the computing device may include receiving information indicating that the other browser extension of the one or more other browser extensions is communicating with a server located at a vulnerable location.

In some embodiments, receiving the report information from the master browser extension on the computing device may include receiving information indicating that the other browser extension of the one or more other browser extensions is sending data to third parties.

In some embodiments, receiving the report information from the master browser extension on the computing device may include receiving information indicating that the other browser extension of the one or more other browser extensions is bypassing a deny list.

In some embodiments, the master browser extension may operate at a high privilege level.

In some embodiments, the computing platform may add a rule to or remove a rule from the rule information including the set of rules defining reportable behavior associated with the one or more other browser extensions, and update the rule information based on the addition or removal of the rule.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
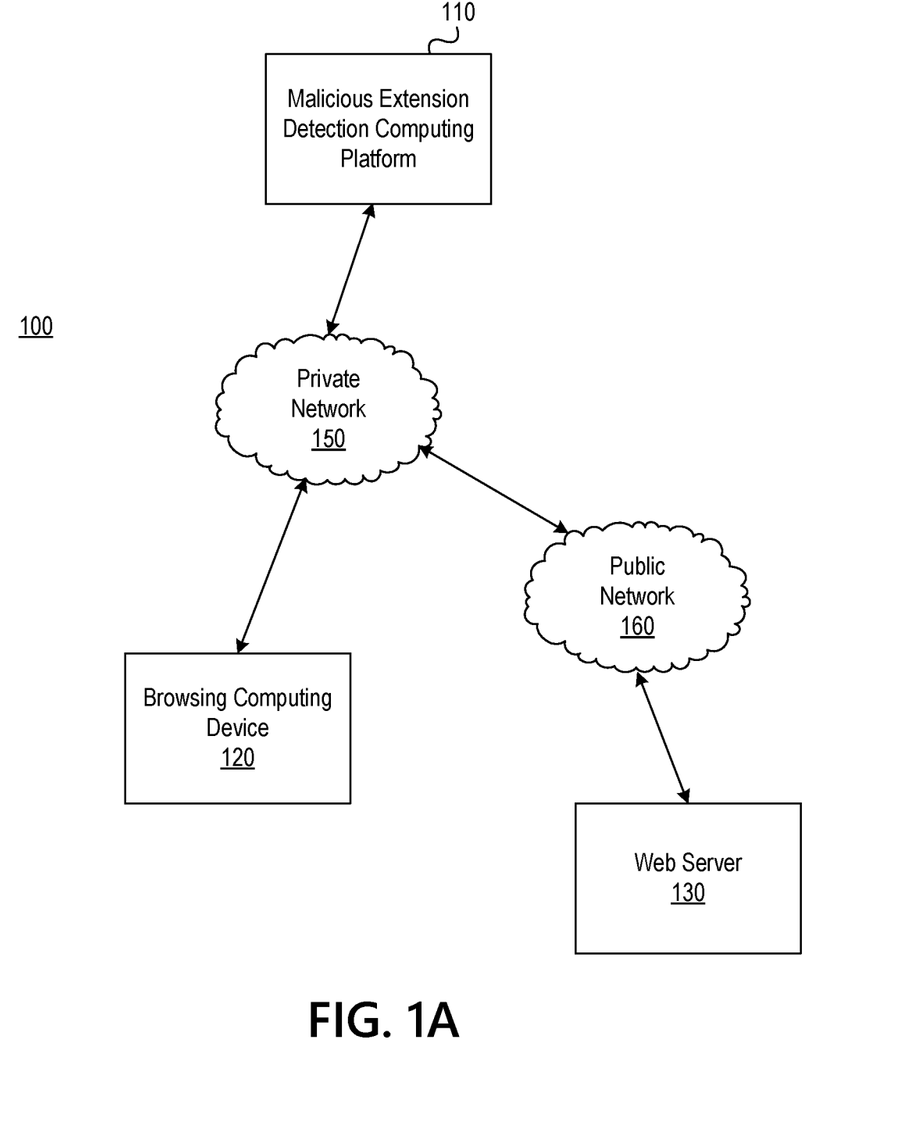
FIGS. 1A-1C depict an illustrative computing environment for detecting and preventing installation and execution of malicious browser extensions in accordance with one or more example embodiments.
Figure 1B:
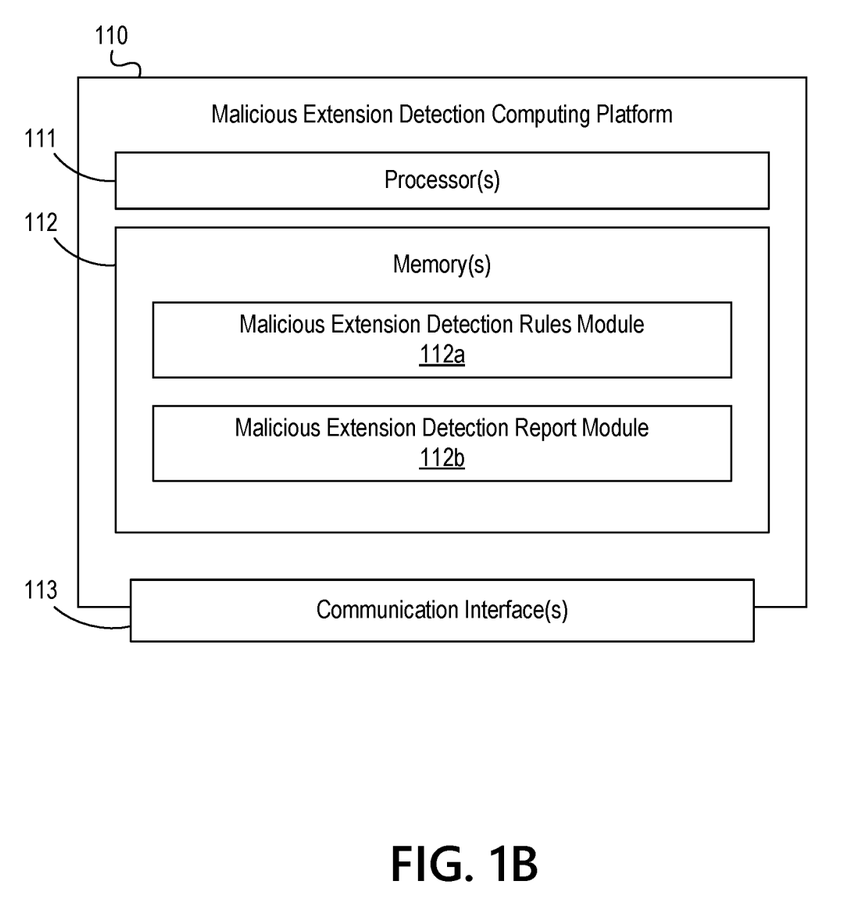
Figure 1C:
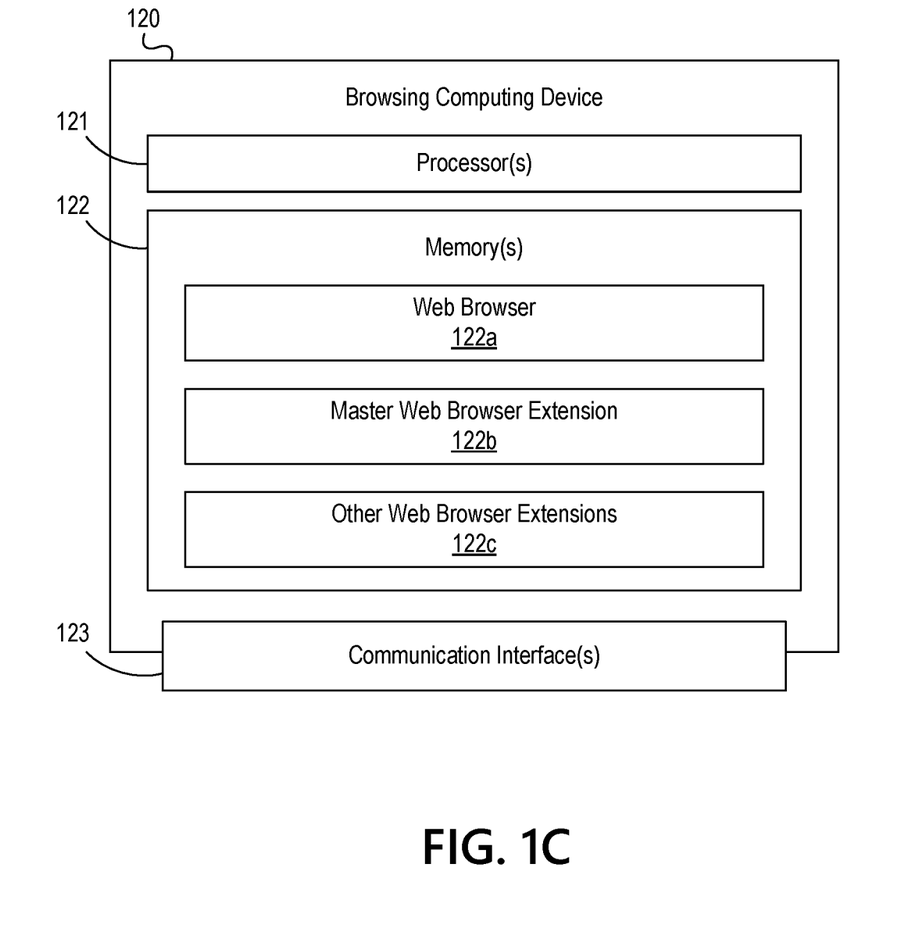

FIGS. 1A-1C depict an illustrative computing environment for detecting and preventing installation and execution of malicious browser extensions in accordance with one or more example embodiments. Referring to FIG. 1A, computing environment 100 may include one or more computing devices and/or other computing systems. For example, computing environment 100 may include malicious extension detection computing platform 110, browsing computing device 120, and web server 130. Although one browsing computing device 120 is shown for illustrative purposes, any number of browsing computing devices may be used without departing from the disclosure. In addition, although one web server 130 is shown for illustrative purposes, any number of web servers may be used without departing from the disclosure.

As illustrated in greater detail below, malicious extension detection computing platform 110 may include one or more computing devices configured to perform one or more of the functions described herein. For example, malicious extension detection computing platform 110 may include one or more computers (e.g., laptop computers, desktop computers, servers, server blades, or the like).

Browsing computing device 120 may include one or more computing devices and/or other computer components (e.g., processors, memories, communication interfaces). For instance, browsing computing device 120 may be, for example, a desktop or laptop computer with a browser software application, a mobile device or mobile phone with Internet capability, or any computing device from which a user can access web content, or the like, and may be associated with an enterprise organization operating malicious extension detection computing platform 110. Browsing computing device 120 may be an endpoint computing device for client-server communications between the browsing computing device 120 and a provider computing device (e.g., one or more servers 130). The browsing computing device 120 may be communicatively coupled to one or more networks 150, 160.

Web server 130 may host one or more remote services. The one or more remote services may include websites (e.g., financial websites, social media websites, e-commerce websites), applications, and/or programs. The one or more remote services may communicate using one or more communication protocols (e.g., HTTP, HTTPS, FTP, SMTP, and the like). Web server 130 may serve or host websites and provide content rendered on a web page. For example, from browsing computing device 120, a user may access web server 130 using an Internet browser, or by executing a software application that communicates with web server 130 over a computer network (e.g., such as the Internet).

Computing environment 100 also may include one or more networks, which may interconnect one or more of malicious extension detection computing platform 110, browsing computing device 120, and web server 130. For example, computing environment 100 may include private network 150 and public network 160. Private network 150 and/or public network 160 may include one or more sub-networks (e.g., local area networks (LANs), wide area networks (WANs), or the like). Private network 150 may be associated with a particular organization (e.g., a corporation, financial institution, educational institution, governmental institution, or the like) and may interconnect one or more computing devices associated with the organization. For example, malicious extension detection computing platform 110, browsing computing device 120, and web server 130 may be associated with an organization (e.g., a financial institution), and private network 150 may be associated with and/or operated by the organization, and may include one or more networks (e.g., LANs, WANs, virtual private networks (VPNs), or the like) that interconnect malicious extension detection computing platform 110, browsing computing device 120, web server 130, and one or more other computing devices and/or computer systems that are used by, operated by, and/or otherwise associated with the organization. Public network 160 may connect private network 150 and/or one or more computing devices connected thereto (e.g., malicious extension detection computing platform 110, browsing computing device 120, and web server 130) with one or more networks and/or computing devices that are not associated with the organization. For example, browsing computing device 120 might not be associated with an organization that operates private network 150, and public network 160 may include one or more networks (e.g., the Internet) that connect browsing computing device 120 to private network 150 and/or one or more computing devices connected thereto (e.g., malicious extension detection computing platform 110, browsing computing device 120, and web server 130).

In one or more arrangements, malicious extension detection computing platform 110, browsing computing device 120, and web server 130 may be any type of computing device capable of receiving a user interface, receiving input via the user interface, and communicating the received input to one or more other computing devices. For example, malicious extension detection computing platform 110, browsing computing device 120, web server 130, and/or the other systems included in computing environment 100 may, in some instances, include one or more processors, memories, communication interfaces, storage devices, and/or other components. As noted above, and as illustrated in greater detail below, any and/or all of the computing devices included in computing environment 100 may, in some instances, be special-purpose computing devices configured to perform specific functions.

Referring to FIG. 1B, malicious extension detection computing platform 110 may include one or more processor(s) 111, memory(s) 112, and communication interface(s) 113. A data bus may interconnect processor 111, memory 112, and communication interface 113. Communication interface 113 may be a network interface configured to support communication between malicious extension detection computing platform 110 and one or more networks (e.g., network 150 or the like). Memory 112 may include one or more program modules having instructions that when executed by processor 111 cause malicious extension detection computing platform 110 to perform one or more functions described herein and/or one or more databases and/or other libraries that may store and/or otherwise maintain information which may be used by such program modules and/or processor 111.

In some instances, the one or more program modules and/or databases may be stored by and/or maintained in different memory units of malicious extension detection computing platform 110 and/or by different computing devices that may form and/or otherwise make up malicious extension detection computing platform 110. For example, memory 112 may have, store, and/or include a malicious extension detection rules module 112a and a malicious extension detection report module 112b. Malicious extension detection rules module 112a may have instructions that direct and/or cause malicious extension detection computing platform 110 to, for instance, provide rules or similar policy information from a repository to carry out malicious extension detection and/or instructions that direct malicious extension detection computing platform 110 to perform other functions, as discussed in greater detail below. Malicious extension detection report module 112b may store information received from browsing computing device 120 (e.g., from master web browser extension 122b) in performing malicious extension detection and/or in performing other functions, as discussed in greater detail below.

Referring to FIG. 1C, browsing computing device (e.g., a laptop computing device, a desktop computing device, a mobile phone, a tablet, and the like) 120 may include one or more processor(s) 121, memory(s) 122, and communication interface(s) 123. A data bus may interconnect processor 121, memory 122, and communication interface 123. Communication interface 123 may be a network interface configured to support communication between browsing computing device 120 and one or more networks (e.g., private network 150, public network 160, or the like).

In some instances, browsing computing device 120 may include an installed web browser 122a. The web browser 122a may be an application stored on computer readable media device (e.g., memory 122) of the browsing computing device 120 to access information (e.g., a web page) on the World Wide Web (e.g., hosted by the one or more servers 130), for example, based on requests (and responses) via HTTP and/or HTTPS. In some instances, the browsing computing device 120 may include web browser extensions (e.g., master web browser extension 122b and other browser extensions 122c) such as applications (e.g., an add-on, a plugin, an extension, and the like) stored on a computer readable media device (e.g., memory 122) of the browsing computing device 120 to supplement, add, and/or otherwise modify the functionality of the web browser 122a. For example, the web browser extensions (e.g., master web browser extension 122b and other browser extensions 122c) may include one or more computer readable instructions, when executed, to enable detection of one or more malicious applications (e.g., malware, and the like) in web pages viewed at the browsing computing device 120. The web browser extensions (e.g., master web browser extension 122b and other browser extensions 122c) may be available in one or more configurations/versions for compatibility with one or more web browsers. The web browser extensions (e.g., master web browser extension 122b and other browser extensions 122c) may be managed/configured by a developer and/or an enterprise organization associated with the browsing computing device 120 and/or a user of the browsing computing device 120. For example, an enterprise organization may install the master web browser extension 122b on a browsing computing device 120 associated with an individual of the enterprise organization. For example, the other web browser extension 122c may be installed on the browsing computing device 120 by an end user, for example, from an "app store" or application marketplace. In some embodiments, the master web browser extension 122b may be installed on the browsing computing device 120 in accordance with enterprise policy and procedures. Once installed, the master web browser extension 122b may register with malicious extension detection rules module 112a and/or malicious extension detection report module 112b in order to gain access to rules and report information, and send and/or receive other data. In some embodiments, the master browser extension (e.g., master web browser extension 122b) operates at a high privilege level (e.g., has administrative privileges, access to all system resources, including memory regions, and/or any special instructions). Such a high privilege level may, for instance, provide greater permissions and/or access rights than normal and/or relatively lower privilege levels associated with other applications and/or resources.

Figure 2A:
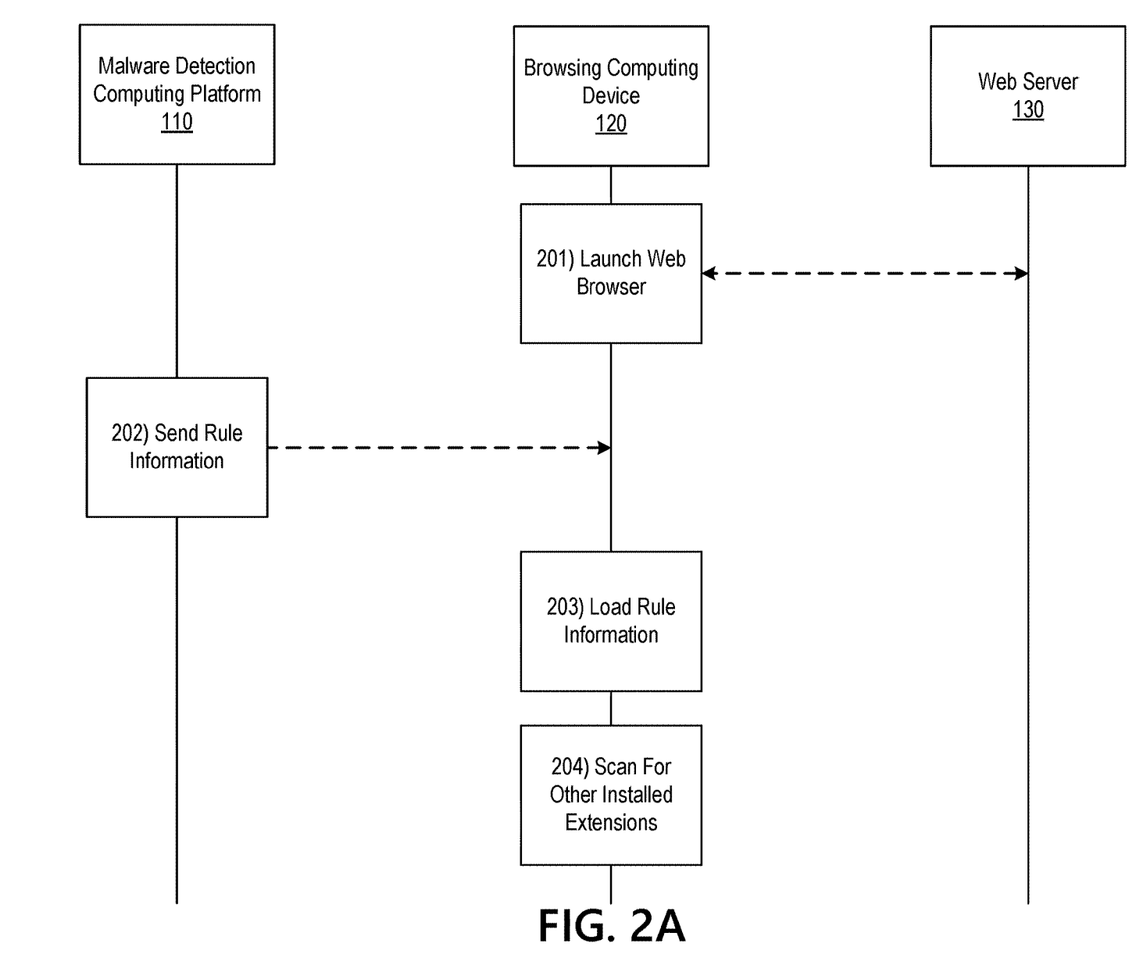
FIGS. 2A-2C depict an illustrative event sequence for detecting and preventing installation and execution of malicious browser extensions in accordance with one or more example embodiments.
Figure 2B:
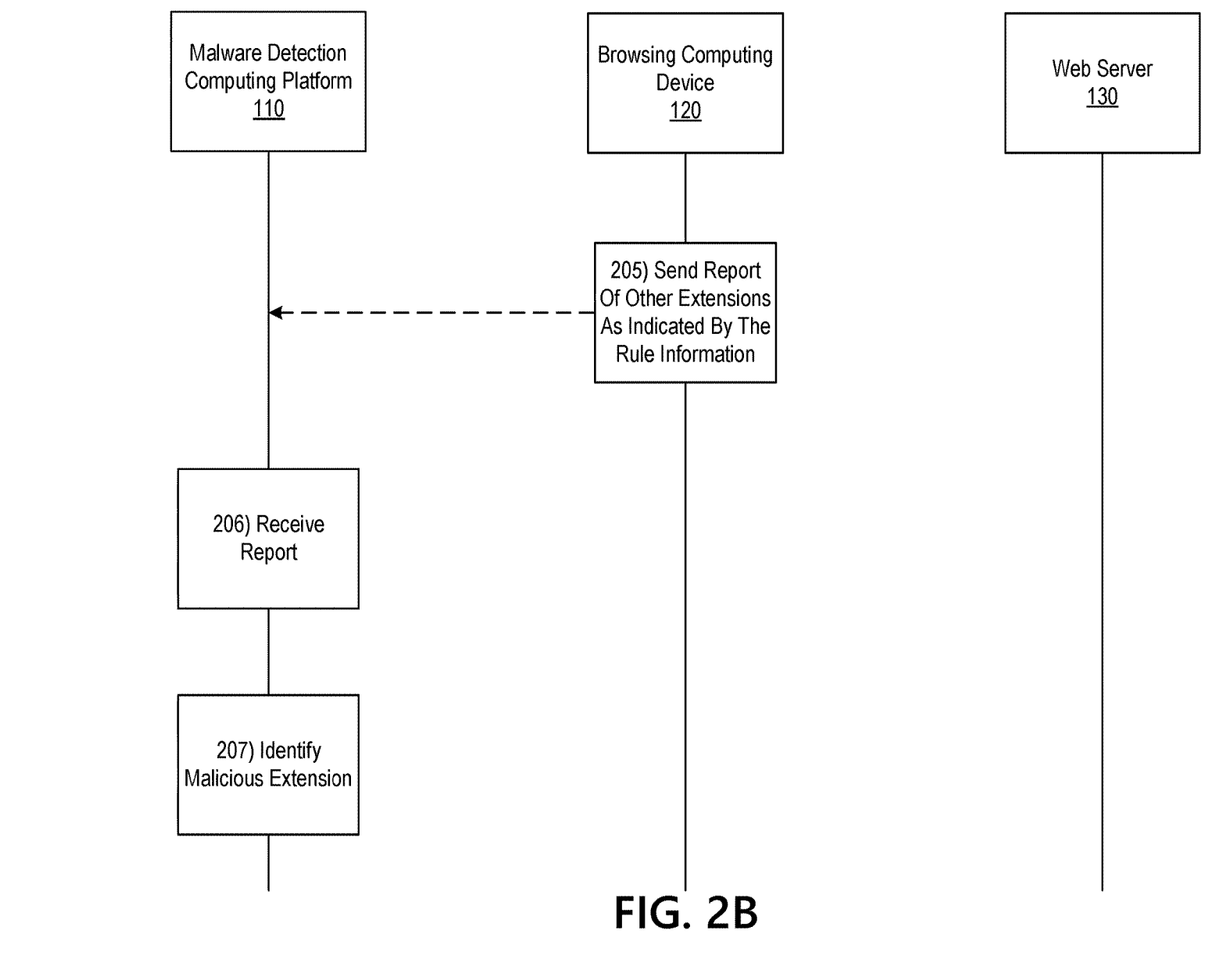
Figure 2C:
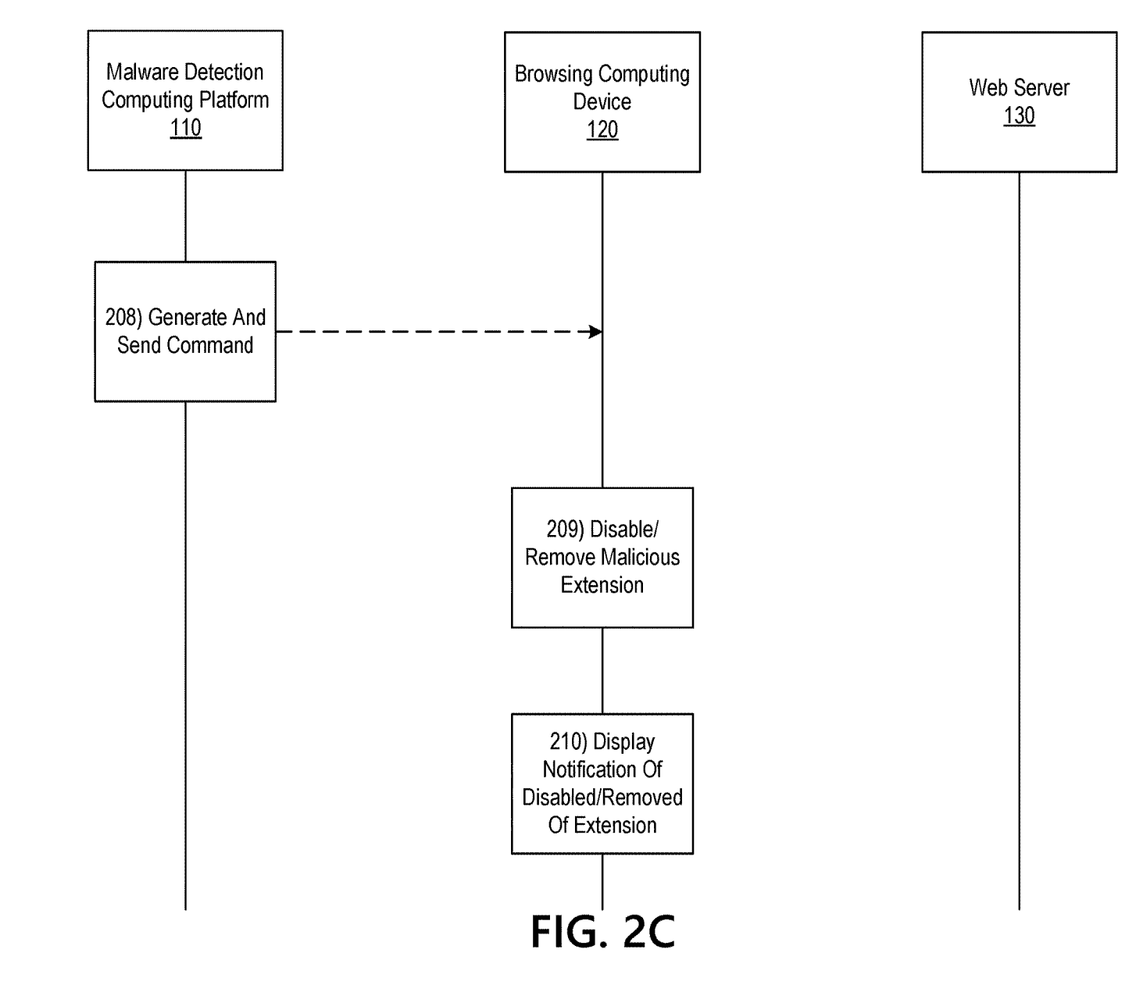

FIGS. 2A-2C depict an illustrative event sequence for detecting and preventing installation and execution of malicious browser extensions in accordance with one or more example embodiments. Referring to FIG. 2A, at step 201, computing device (e.g., browsing computing device 120) may launch a web browser (e.g., web browser 122a). For example, computing device (e.g., browsing computing device 120) may communicate with web server 130 to open a website or web page (e.g., provided by web server 130). For instance, the computing device (e.g., browsing computing device 120) may access a website using HTTP and/or HTTPS via web browser 122a, and the website may send and receive data from one or more networks (e.g., the Internet).

At step 202, malicious extension detection computing platform 110 may send, via the communication interface (e.g., communication interface 113), to a master browser extension (e.g., master web browser extension 122b) on a computing device (e.g., browsing computing device 120), rule information including a set of rules defining reportable behavior (e.g., anomalous or suspicious behavior) associated with one or more other browser extensions (e.g., web browser extensions 122c). For example, the rule information may specify the types of information that should be reported.

At step 203, the malicious extension detection computing platform 110 may cause the master browser extension (e.g., master web browser extension 122b) on the computing device (e.g., browsing computing device 120) to load the rule information (e.g., from malicious extension detection rules module 112a of malicious extension detection computing platform 110). In some examples, the master browser extension (e.g., master web browser extension 122b) may load the rule information based on activation and/or startup of the web browser (e.g., web browser 122a), for example, at step 201.

At step 204, malicious extension detection computing platform 110 may cause the master browser extension (e.g., web browser extension 122b) on the computing device (e.g., browsing computing device 120) to scan every existing browser extension on the computing device and discover one or more other browser extensions (e.g., other web browser extensions 122c) on the computing device (e.g., browsing computing device 120) that exhibit the reportable behavior defined by at least one rule of the set of rules in the rule information. Such reportable behavior may include a browser extension exhibiting behavior similar to a known or suspected malicious behavior. In some examples, the reportable behavior may include a browser extension requesting high risk or unnecessary permissions (e.g., requesting to have full network access, requesting access to certain files, requesting access to every website, reading private or sensitive information, and/or the like). In some examples, the reportable behavior may include a browser extension communicating with a server located at a vulnerable location (e.g., in a high-risk country or area where exchange of data is not preferred or considered risky, which may include certain countries or blocks of IP addresses). In some examples, the reportable behavior may include a browser extension sending data to third parties and/or to unexpected or unknown destinations. In some examples, the reportable behavior may include a browser extension being on or attempting to bypassing a deny list (e.g., write data so as to bypass a deny list that would otherwise have blocked the extension from being installed). In some embodiments, the master browser extension (e.g., web browser extension 122b) may scan the one or more other browser extensions (e.g., other web browser extensions 122c) upon startup of a browser, on a periodic basis (e.g., every hour), based on a new extension being installed, or based on a browser accessing a specific website.

Referring to FIG. 2B, at step 205, the master browser extension on the computing device (e.g., master web browser extension 122b) may generate and send report information associated with the one or more other browser extensions discovered at step 203 (e.g., a report of suspicious behaviors exhibited). At step 206, malicious extension detection computing platform 110 may receive, via the communication interface (e.g., communication interface 113) and/or at a report server (e.g., malicious extension detection report module 112b), the report information from the master browser extension on the computing device (e.g., master web browser extension 122b). In addition, the report information may include an identification of an other browser extension of the one or more other browser extensions that exhibits the reportable behavior defined by at least one rule of the set of rules in the rule information (e.g., loaded in step 203). In addition, the report information may include an indication of which rules of the set of rules (e.g., loaded in step 203) have been met.

At step 207, malicious extension detection computing platform 110 may, based on receiving the report information at step 206, determine that the identified other browser extension is a malicious or potentially malicious extension. In some examples, in determining that the identified other browser extension is a malicious or potentially malicious extension, malicious extension detection computing platform 110 may evaluate the number and/or combination of rules of the set of rules indicated as being met. For example, malicious extension detection computing platform 110 may determine whether an identified browser extension has met too many rules indicating suspicious behavior and should be disabled or uninstalled, or whether an identified browser extension has met only rule indicating suspicious behavior and is allowed to keep running. Additionally or alternatively, in some other examples, in determining that the identified other browser extension is a malicious or potentially malicious extension, malicious extension detection computing platform 110 may generate and assign a risk score for the identified malicious or potentially malicious extension and compare the risk score to a predetermined threshold value to make a malicious extension determination. For example, in response to the risk score exceeding the predetermined threshold value, the malicious extension determination (e.g., extension is untrusted or unsafe) may be confirmed. In response to the risk score remaining within the predetermined threshold value, the malicious extension determination may not be made (e.g., extension is safe to use).

Referring to FIG. 2C, at step 208, malicious extension detection computing platform 110 may send, via the communication interface (e.g., communication interface 113), to the master browser extension on the computing device (e.g., master web browser extension 122b), one or more commands directing the master browser extension on the computing device (e.g., master web browser extension 122b) to disable or remove the other browser extension identified as malicious or potentially malicious. In turn, at step 209, the master browser extension on the computing device (e.g., master web browser extension 122b) may disable or remove (e.g., uninstall) the other browser extension identified as malicious or potentially malicious. Given that master browser extension (e.g., master web browser extension 122b) operates at a high or highest privilege level (e.g., including reading information of other extensions, disabling or removing other extensions, and/or adding new extensions), the master browser extension (e.g., master web browser extension 122b) may disable or remove other browser extensions by changing settings in the web browser (e.g., web browser 122a).

Figure 3:
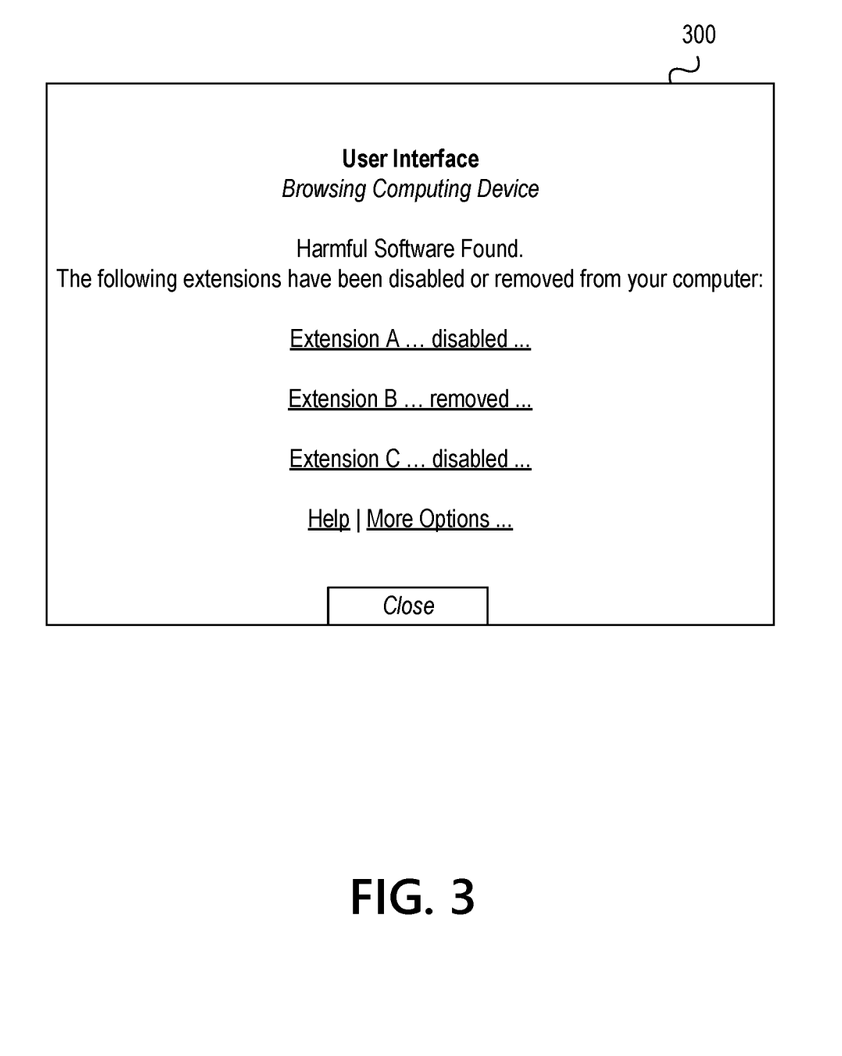
FIG. 3 depict example graphical user interfaces for detecting and preventing installation and execution of malicious browser extensions in accordance with one or more example embodiments.

In some embodiments, in sending the one or more commands to the master browser extension on the computing device (e.g., master web browser extension 122b) directing the master browser extension to disable or remove the identified other browser extension, malicious extension detection computing platform 110 may, at step 210, cause the computing device (e.g., browsing computing device 120) to display and/or otherwise present one or more graphical user interfaces similar to graphical user interface 300, which is illustrated in FIG. 3. As seen in FIG. 3, graphical user interface 300 may include text and/or other information notifying the user of the computing device (e.g., browsing computing device 120) of malware detected by the master browser extension (e.g., master web browser extension 122b) and/or notifying the user of the computing device (e.g., browsing computing device 120) of the disabling or removal of the identified other browser extension. (e.g., "Harmful Software Found. The following extensions have been disabled or removed from your computer. [Extension A . . . disabled . . . ] [Extension B . . . removed . . . ] [Extension C . . . disabled . . . ]"). Additionally or alternatively, similar notifications may be sent to individuals or entities with an organization (e.g., cybersecurity team, administrators, or the like).

Additionally or alternatively, in some embodiments, malicious extension detection computing platform 110 may (e.g., prior to sending the rule information at step 202, or at any time during the event sequence depicted in FIGS. 2A-2C) add a rule to or remove a rule from the rule information. In addition, malicious extension detection computing platform 110 may update the rule information based on the addition or removal of the rule and store the updated rule information, thereby providing additional customization features. Custom rules may be received, for example, from client devices (e.g., browsing computing device 120), from an administrator, or from any other suitable source. For example, malicious extension detection computing platform 110 may use a machine learning algorithm or similar algorithm to define or redefine a set of rules utilized for defining reportable behavior associated with one or more other browser extensions. For instance, information about various reportable behaviors may be provided to a machine learning algorithm, and a machine learning process may be used to tune parameters for determining custom rules.

Figure 4:
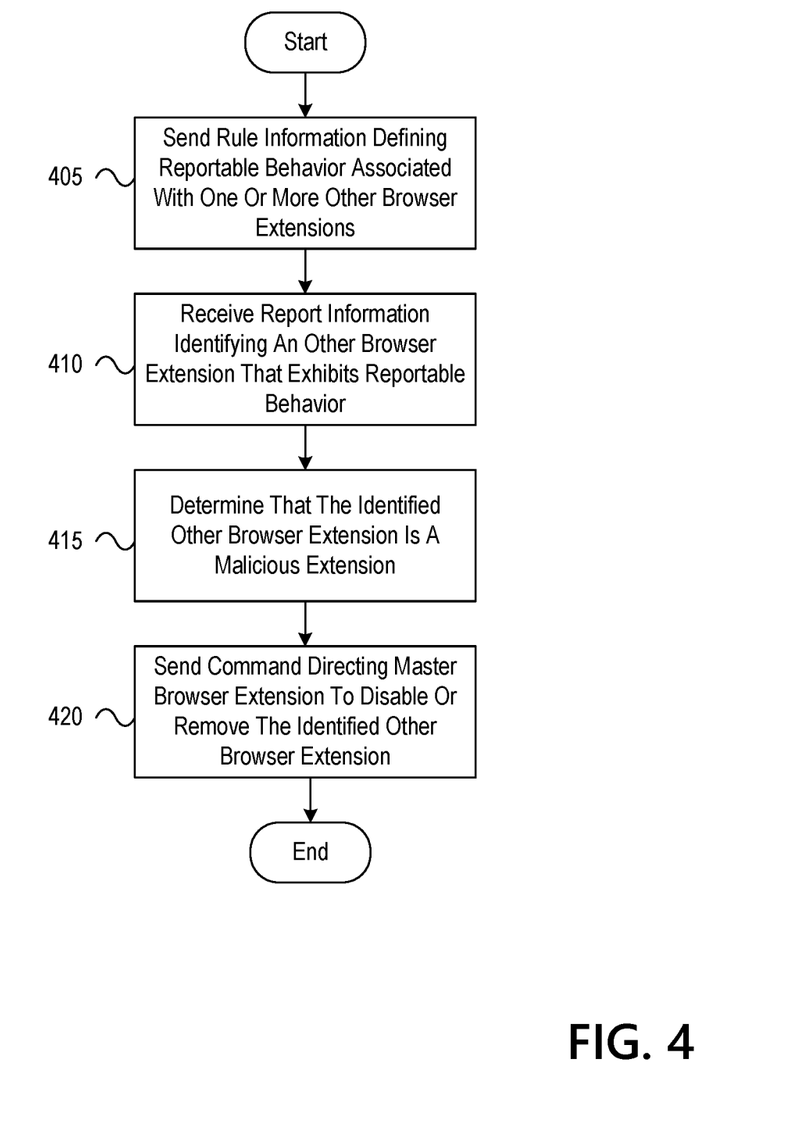
FIG. 4 depicts an illustrative method for detecting and preventing installation and execution of malicious browser extensions in accordance with one or more example embodiments.

FIG. 4 depicts an illustrative method for detecting and preventing malicious browser extensions in accordance with one or more example embodiments. Referring to FIG. 4, at step 405, a computing platform having at least one processor, a communication interface, and memory may send, via the communication interface, to a master browser extension on a computing device, rule information including a set of rules defining reportable behavior associated with one or more other browser extensions. At step 410, the computing platform may receive, via the communication interface, from the master browser extension on the computing device, report information identifying an other browser extension of the one or more other browser extensions that exhibit the reportable behavior defined by at least one rule of the set of rules in the rule information. At step 415, the computing platform may, based on receiving the report information, determine that the identified other browser extension is a malicious extension. At step 420, the computing platform may send, via the communication interface, to the master browser extension on the computing device, one or more commands directing the master browser extension on the computing device to disable or remove the identified other browser extension.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   send, via the communication interface, to a master browser extension on a computing device, rule information including a set of rules defining reportable behavior associated with one or more other browser extensions;
   receive, via the communication interface, from the master browser extension on the computing device, report information identifying an other browser extension of the one or more other browser extensions that exhibits the reportable behavior defined by at least one rule of the set of rules in the rule information, wherein receiving the report information includes receiving information indicating which rules of the set of rules have been met;
   based on receiving the report information, determine that the identified other browser extension is a malicious extension; and
   send, via the communication interface, to the master browser extension on the computing device, one or more commands directing the master browser extension on the computing device to disable or remove the identified other browser extension.

2. The computing platform of claim 1, wherein the memory stores additional computer-readable instructions that, when executed by the at least one processor, cause the computing platform to:
cause a notification indicating the disabling or removal of the identified other browser extension to be displayed on a display device of the computing device.

3. The computing platform of claim 1, wherein determining that the identified other browser extension is a malicious extension comprises evaluating a combination of rules of the set of rules indicated as being met.

4. The computing platform of claim 1, wherein the memory stores additional computer-readable instructions that, when executed by the at least one processor, cause the computing platform to:
cause the master browser extension on the computing device to scan the one or more other browser extensions on the computing device upon startup of a browser, on a periodic basis, based on a new extension being installed, or based on a browser accessing a specific website.

5. The computing platform of claim 1, wherein the memory stores additional computer-readable instructions that, when executed by the at least one processor, cause the computing platform to:
cause the master browser extension on the computing device to discover one or more other browser extensions on the computing device that exhibit the reportable behavior defined by at least one rule of the set of rules in the rule information.

6. The computing platform of claim 1, wherein the memory stores additional computer-readable instructions that, when executed by the at least one processor, cause the computing platform to:
cause the master browser extension to be installed on the computing device in accordance with enterprise policy.

7. The computing platform of claim 1, wherein receiving the report information from the master browser extension on the computing device further comprises receiving information indicating that the identified other browser extension of the one or more other browser extensions is requesting high risk permissions.

8. The computing platform of claim 1, wherein receiving the report information from the master browser extension on the computing device further comprises receiving information indicating that the identified other browser extension of the one or more other browser extensions is communicating with a server located at a vulnerable location.

9. The computing platform of claim 1, wherein receiving the report information from the master browser extension on the computing device further comprises receiving information indicating that the identified other browser extension of the one or more other browser extensions is sending data to third parties.

10. The computing platform of claim 1, wherein receiving the report information from the master browser extension on the computing device further comprises receiving information indicating that the identified other browser extension of the one or more other browser extensions is bypassing a deny list.

11. The computing platform of claim 1, wherein the master browser extension operates at a high privilege level.

12. The computing platform of claim 1, wherein the memory stores additional computer-readable instructions that, when executed by the at least one processor, cause the computing platform to:
add a rule to or remove a rule from the rule information including the set of rules defining reportable behavior associated with the one or more other browser extensions; and
update the rule information based on the addition or removal of the rule.

13. A method, comprising:
at a computing platform comprising at least one processor, a communication interface, and memory:
sending, by the at least one processor, via the communication interface, to a master browser extension on a computing device, rule information including a set of rules defining reportable behavior associated with one or more other browser extensions;
receiving, by the at least one processor, via the communication interface, from the master browser extension on the computing device, report information identifying an other browser extension of the one or more other browser extensions that exhibits the reportable behavior defined by at least one rule of the set of rules in the rule information, wherein receiving the report information includes receiving information indicating which rules of the set of rules have been met;
based on receiving the report information, determining, by the at least one processor, that the identified other browser extension is a malicious extension; and
sending, by the at least one processor, via the communication interface, to the master browser extension on the computing device, one or more commands directing the master browser extension on the computing device to disable or remove the identified other browser extension.

14. The method of claim 13, further comprising:
causing, by the at least one processor, a notification indicating the disabling or removal of the identified other browser extension to be displayed on a display device of the computing device.

15. The method of claim 13, wherein determining that the identified other browser extension is a malicious extension comprises evaluating a combination of rules of the set of rules indicated as being met.

16. The method of claim 13, further comprising:
causing, by the at least one processor, the master browser extension on the computing device to scan the one or more other browser extensions on the computing device at browser startup, on a periodic basis, based on a new extension being installed, or based on a browser accessing a specific website.

17. The method of claim 13, further comprising:
causing, by the at least one processor, the master browser extension on the computing device to discover one or more other browser extensions on the computing device that exhibits the reportable behavior defined by at least one rule of the set of rules in the rule information.

18. One or more non-transitory computer-readable media storing instructions that, when executed by a computing platform comprising at least one processor, a communication interface, and memory, cause the computing platform to:
send, via the communication interface, to a master browser extension on a computing device, rule information including a set of rules defining reportable behavior associated with one or more other browser extensions;

receive, via the communication interface, from the master browser extension on the computing device, report information identifying an other browser extension of the one or more other browser extensions that exhibits the reportable behavior defined by at least one rule of the set of rules in the rule information, wherein receiving the report information includes receiving information indicating which rules of the set of rules have been met;

based on receiving the report information, determine that the identified other browser extension is a malicious extension; and send, via the communication interface, to the master browser extension on the computing device, one or more commands directing the master browser extension on the computing device to disable or remove the identified other browser extension.

\* \* \* \* \*